(12) United States Patent
Karl

(10) Patent No.: US 11,215,498 B2
(45) Date of Patent: Jan. 4, 2022

(54) INTEGRATED WEIGHING SYSTEM FOR A LUGGAGE CASE

(71) Applicant: Samsonite IP Holdings S.a r.l., Luxembourg (LU)

(72) Inventor: Philip J. Karl, Rehoboth, MA (US)

(73) Assignee: Samsonite IP Holdings S.a r.l., Luxembourg (LU)

( * ) Notice: Subject to any disclaimer, the term of this patent is extended or adjusted under 35 U.S.C. 154(b) by 127 days.

(21) Appl. No.: 16/778,986

(22) Filed: Jan. 31, 2020

(65) Prior Publication Data

US 2021/0239513 A1    Aug. 5, 2021

(51) Int. Cl.
*G01G 19/52* (2006.01)
*G01G 3/14* (2006.01)

(52) U.S. Cl.
CPC ........... *G01G 19/52* (2013.01); *G01G 3/1412* (2013.01)

(58) Field of Classification Search
CPC ...... G01G 3/14; G01G 3/1402; G01G 3/1412; G01G 19/52; G01G 19/58
See application file for complete search history.

(56) References Cited

U.S. PATENT DOCUMENTS

| | | | |
|---|---|---|---|
| 5,313,022 A * | 5/1994 | Piroozmandi | G01L 1/2231 177/211 |
| 9,770,084 B1 | 9/2017 | Shiekh | |
| 10,039,362 B2 | 8/2018 | O'hare | |
| 10,274,361 B2 * | 4/2019 | Lee | G01G 19/52 |
| 2017/0219418 A1 | 8/2017 | Kellis | |

FOREIGN PATENT DOCUMENTS

| | | |
|---|---|---|
| CN | 203860607 U | 10/2014 |
| CN | 204336069 U | 5/2015 |
| CN | 105054538 A | 11/2015 |
| CN | 205456707 U | 8/2016 |
| CN | 206213467 U | 6/2017 |
| CN | 206964247 U | 2/2018 |
| CN | 206978992 U | 2/2018 |
| CN | 107884048 A | 4/2018 |
| CN | 108741509 A | 11/2018 |
| CN | 108741513 A | 11/2018 |
| EP | 2737820 B1 | 4/2017 |

* cited by examiner

*Primary Examiner* — Randy W Gibson
(74) *Attorney, Agent, or Firm* — Dorsey & Whitney LLP

(57) ABSTRACT

The present disclosure relates to a weighing assembly (100) for a luggage case (101). The weighing assembly (100) includes at least one support (107) in contact with a surface that supports a portion of a weight of the luggage case (101). A floating element (108) is coupled to the support (107). A deflection member (110) is coupled to the floating element (108), and the portion of the weight of the luggage case (101) causes an elastic deflection of the deflection member (110). A load cell member (112) disposed adjacent to and separate from the deflection member (110). The load cell member (112) is separate from the deflection member (110) the elastic deflection of the deflection member (110) causes a deflection of the load cell member (112), the load cell member (112) senses the amount of deflection, which correlates to the portion of the weight of the luggage (101).

20 Claims, 7 Drawing Sheets

INTEGRATED WEIGHING SYSTEM FOR A LUGGAGE CASE

FIELD

The present disclosure relates generally to systems integrated into a luggage article to determine a weight thereof.

BACKGROUND

Travelers frequently pack personal belongings in luggage articles for transport during a trip. Many carriers, such as airlines, impose weight limits on luggage articles. Problems can arise when a traveler does not realize a luggage article is overweight until checking in at the airport, for example, when the luggage is placed on a scale. The traveler may not, at that time, be able to lighten the load in the luggage article, and further may not want to face the embarrassment of unpacking the luggage in a public setting, while holding up a queue.

Weigh systems have been developed for luggage articles that allow an article to be weighed using sensors associated with the luggage article. Many of these systems employ a fish-scale type of solution that weighs a luggage article when a user lifts the luggage off the ground. Such systems have the disadvantage of requiring a user to lift the luggage, which some users may not be able to do.

It is therefore desirable to provide an improved integrated weigh system for a luggage article that allows a user to determine a weight of the luggage without the luggage being lifted

SUMMARY

The present disclosure provides a weighing assembly for a luggage case. In one example, the weighing assembly includes at least one support that carries a portion of a weight of the luggage case when positioned on a support surface. A deflection member is coupled to the support. The portion of the weight of the luggage case causes a deflection of the deflection member. A load cell member is disposed adjacent to and separate from the deflection member. The load cell member is separate from the deflection member. The elastic deflection of the deflection member causes a deflection of the load cell member, the load cell member senses the amount of deflection, and the sensed deflection of the load cell member correlates to the portion of the weight of the luggage.

Optionally, in some embodiments, the weighing assembly may include a floating element disposed between the deflection member and the support to couple the support to the deflection member via the floating element. The support may be a spinner wheel, a foot, or a post.

Optionally, in some embodiments, the deflection member may be cantilevered from a support housing. The support housing may be adapted to couple to a luggage article. One portion of the deflection member may be secured to the support housing, and another portion of the deflection member secured to the floating member. The deflection member may define an elongated body member the one portion may be a first end portion, and the another portion may be an opposing end portion. The deflection member may be steel. The deflection member may include a substantially prismatic beam. The deflection member may include a transverse aperture that modifies an elastic characteristic of the deflection member.

Optionally, in some embodiments, the load cell member may include a strain sensor that correlates a strain of the load cell member to the deflection of the load cell. At least one of the deflection of the load cell member or the deflection of the deflection member may be correlated to at least a portion of the weight of the luggage case. The deflection of the load cell member and the deflection of the deflection member may together be correlated to at least a portion of the weight of the luggage case. The load cell member may slip with respect to an upper surface of the deflection member.

Optionally, in some embodiments, the load cell member may include three strain sensors that together correlate a respective strain of each of the three strain sensors to the deflection of the load cell member. Each of the three strain sensors may be oriented with a respective plane. Two strain sensors may be oriented with first and second planes that are parallel to and offset from one another; and the third strain sensor may be oriented with a third plane orthogonal to the first and second planes. Each of the three respective planes may be mutually orthogonal from each of the other respective planes.

Optionally, in some embodiments, the load cell member may include a longitudinal structure having two opposing ends separated by a length. The load cell member may receive a downward load at one end of the respective two opposing ends, and an upward load at the other end of the two respective ends. Optionally, the load cell member may receive a distributed load from the deflection member.

Optionally, one portion of the deflection member may be secured to the support housing, and another portion of the deflection member may be secured to the floating member. The one portion may be a first end portion, and the another portion may be an opposing end portion.

Optionally, a luggage case including a weighing assembly may determine the weight of the luggage case. The luggage case may include a plurality of weighing assemblies, for example, four weighing assemblies. The plurality of weighing assemblies may individually determine a portion of the weight of the luggage case, which portions may sum to the total weight of the luggage case. For example, in some embodiments, the luggage case may include a processing element that communicates with each of the plurality of weighing assemblies; determines a weight associated with each of the plurality of weighing assemblies; combines the weight associated with each of the plurality of weighing assemblies to determine a total weight of the luggage case; and displays the total weight of the luggage case. The weighing assembly may be activated by an actuator, such as a button. The luggage case may include a display to display the total weight of the luggage case. The display may be recessed into a shell of the luggage case. The processing element may wirelessly transmit the total weight of the luggage case to a user device.

The present disclosure provides a weighing assembly for a luggage case. In one example, the weighing assembly includes at least one support that carries a portion of a weight of the luggage case when positioned on a support surface. A substantially prismatic deflection member is coupled to the support. The portion of the weight of the luggage case causes a deflection of the deflection member. A load cell member is affixed to the deflection member such that the elastic deflection of the deflection member causes a deflection of the load cell member, the load cell member senses the amount of deflection, and the sensed deflection of the load cell member correlates to the portion of the weight of the luggage.

BRIEF DESCRIPTION OF THE DRAWINGS

The description will be more fully understood with reference to the following figures in which components may not be drawn to scale, which are presented as various embodiments of the disclosure and should not be construed as a complete recitation of the scope of the disclosure, characterized in that.

DETAILED DESCRIPTION

Referring to FIGS. 1-7 an integrated weighing assembly 100 for a luggage article according to an embodiment is disclosed.

Figure 1:
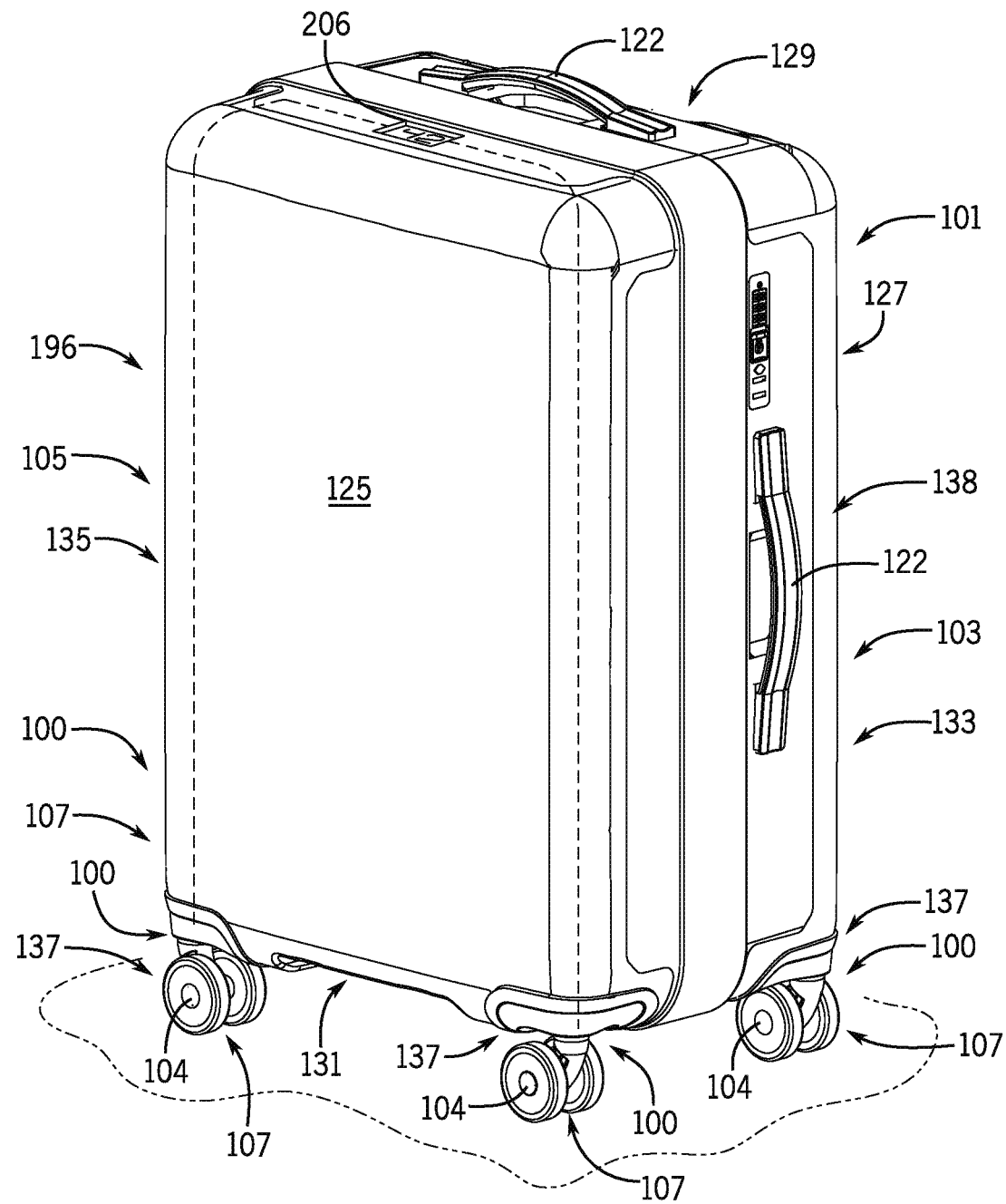
FIG. 1 is an isometric view of a luggage article including weighing assemblies integrated into the wheel assemblies.

FIG. 1 is an isometric view of a luggage article 101 in a closed configuration. The luggage article 101 illustrated in FIG. 1 is an upright spinner hard side case but may be many types of luggage, including a soft side spinner case, a hybrid spinner case, a container, a backpack, a duffle bag, or the like. The luggage article has a plurality of panels defining an internal storage volume to carry a user's belongings. The luggage article 101 includes opposing front and rear panels 125, 127; top and bottom panels 129, 131; and opposing left and right side panels 133, 135. Corner regions 132 may be defined by the intersection of any two or three adjacent panels. The luggage article 101 can be moved between a closed configuration in which a lid 105 and a base 103 are positioned adjacent one another to enclose a user's belongings within the internal storage volume. The luggage article 101 can be configured in an open position with the lid 105 and the base 103 positioned apart from one another. The lid 105 and the base 103 may be pivotably attached together such as by a hinge 196 or similar mechanism, and may be releasably attached by a closure mechanism 138 to releasably secure the lid 105 and the base 103 together in the closed configuration. In some examples, the luggage article 101 may include one or more carry handles 122, 123 and/or a retractable tow handle (not shown) extendable from a rear panel of the luggage article 101.

The luggage article 101 includes one or more support members 107 to support the luggage article 101 against a support surface (e.g., against the ground). The support members 107, which may be a fixed wheel assembly, a spinner wheel assembly, a foot, a post, a caster, or any combination thereof, may be associated with any suitable panel of the luggage article 101, e.g., the bottom panel 131. As shown, the luggage article 101 may include four support members 107. In the embodiment shown, the weighing assembly 100 is integrated in a double-caster spinner assembly. In other embodiments a weighing assembly embodiment 100 can be integrated in other types of supports 107 such as wheels, feet, posts, casters, or other supports.

The weight of the luggage article 101 may be supported on one or more of the supports 107, such that at least a portion of the weight is communicated to the support surface by the one or more supports 107. The panels of the luggage article bear its weight, and that of its contents, and can communicate that weight to the supports 107. A weighing assembly 100 associated with a support 107 can detect the portion of the weight of the luggage article 101 communicated to the support surface through that support.

A weighing assembly 100 includes a deflection member 110 that deflects in response to an applied portion of the weight of the luggage article 101. The deflection of the deflection member 110 can be correlated to the portion of the weight applied. The deflection member 110 communicates at least a portion of the weight of the luggage case 101 from a housing 114 operatively coupled to a panel, to the deflection member 110. The deflection member 110 further communicates at least a portion of the weight to the support surface via a floating element to a support 107. Thus, a portion of the weight of the luggage article 101 communicated to the support surface by the weighing assembly 100 causes the deflection member 110 to deflect, such as by bending. The bending of the deflection member 110 can be detected by a suitable sensor and correlated to the portion of the weight communicated to the support surface by the weighing assembly 100.

When more than one weighing assembly 100 is included in a luggage article 101, the weighing assemblies 100 can collectively communicate the whole weight of the luggage article 101, and its contents, to the support surface. Each weighing assembly 100 can detect a relative portion of the weight, and those detections can be combined to determine the whole weight of the luggage article 101.

Figure 2:
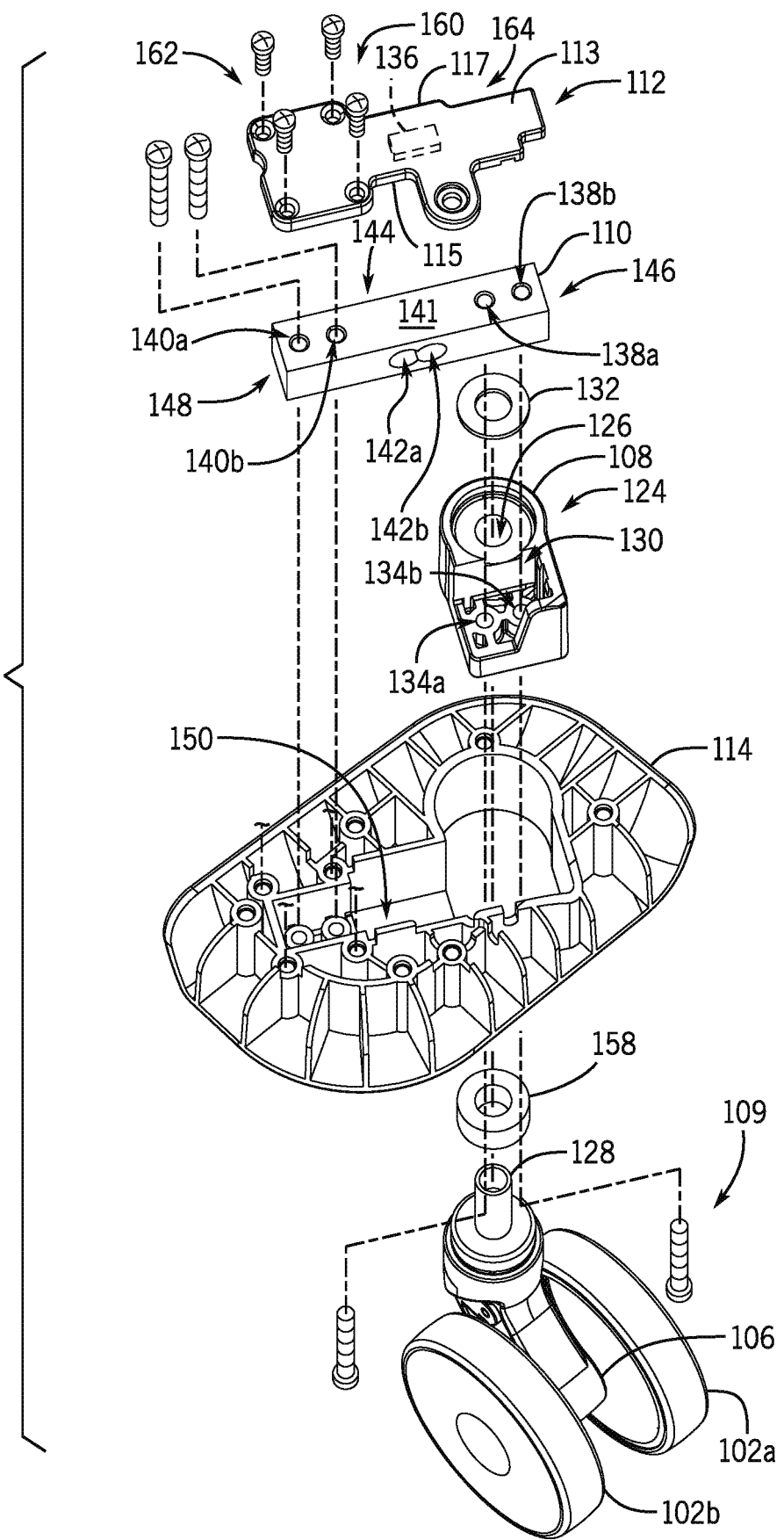
FIG. 2 is an exploded view of the weighing assembly of FIG. 1.
Figure 3:
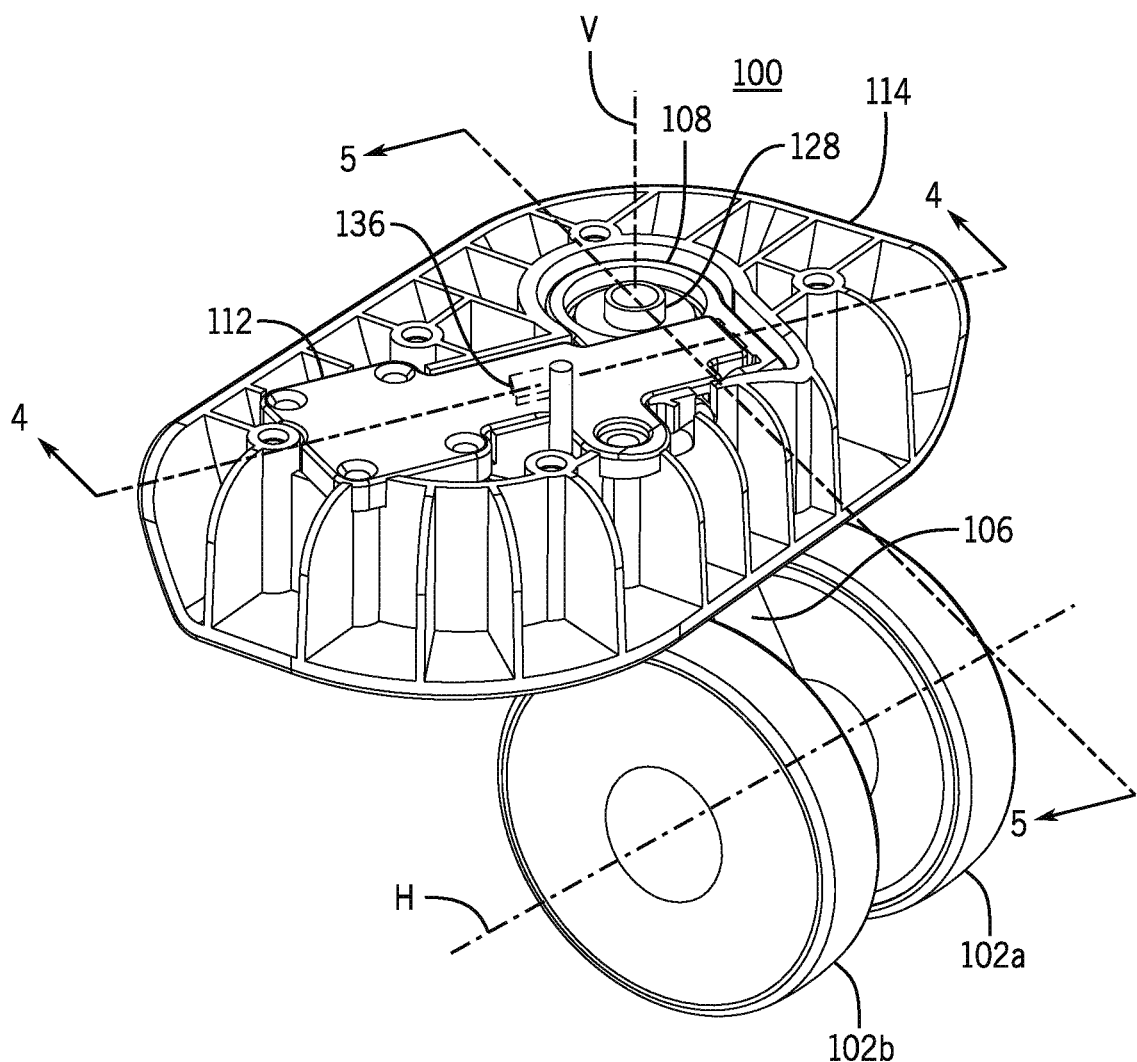
FIG. 3 is an isometric view of a weighing assembly integrated into a wheel assembly for use in a wheeled luggage article.

FIGS. 2 and 3 show a weighing assembly 100 in an exploded and assembled view, respectively. In this example, a support housing 114 is shown and is attached to panels of the luggage article 101 at a corner 137 (see FIG. 1). In this example, the support 107 is a spinner assembly 109. A deflection member 110 is disposed between the support housing 114 and the spinner assembly 109 such that the support housing 114 and the spinner assembly do not directly contact one another, but are connected via the deflection member 110 and a floating element 108. As the support housing 114 and the spinner assembly 109 move relative to one another, such as by the addition or removal of weight from the luggage article 101, the deflection member 110 deflects according to their relative movement. In this example, the support housing 114 pushes down due to the portion of the weight of luggage case communicated there through. The spinner assembly 109 does not move vertically, because it engages the support surface (e.g., the ground). The deflection member 110 deflects relatively downwardly where connected to the support housing 114. The amount of deflection indicates the portion of the weight of the luggage case applied to the deflection member 110 by the support housing 114 and the spinner assembly 109. The amount of deflection is read by a suitable sensor, such as a strain gauge in communication with the deflection member 110 and translated into a signal that corresponds to the portion of the weight applied to the support 107 by the support housing 114.

As shown in FIGS. 2 and 3, the embodiment 100 of the weighing assembly shown includes a spinner assembly 109.

The spinner assembly 109 includes two casters 102a, 102b that are mounted to, and spin about an axle 104. The axle 104 is supported by a fork 106, and is generally horizontally disposed as shown in FIG. 1. The fork 106 is coupled to a floating element 108 by an axle 128. The two caster wheels 102a, 102b together with the fork 106 rotate about axle 128, which is disposed generally in a vertical orientation. This wheel structure is commonly referred to as a spinner wheel.

The casters 102a, 102b support the luggage case 101 on a support surface, such as a floor, the ground, or other surfaces. The casters 102a, 102b spin about the axle 104, for example, when the luggage case 101 is being moved across the surface, thereby facilitating motion of the luggage case 101. In other embodiments, other supports 107 such as feet, posts, or other wheel assemblies are contemplated, such as a spinner wheel having a single caster 102, or a non-spinner wheel structure having one or more casters.

Figure 5:
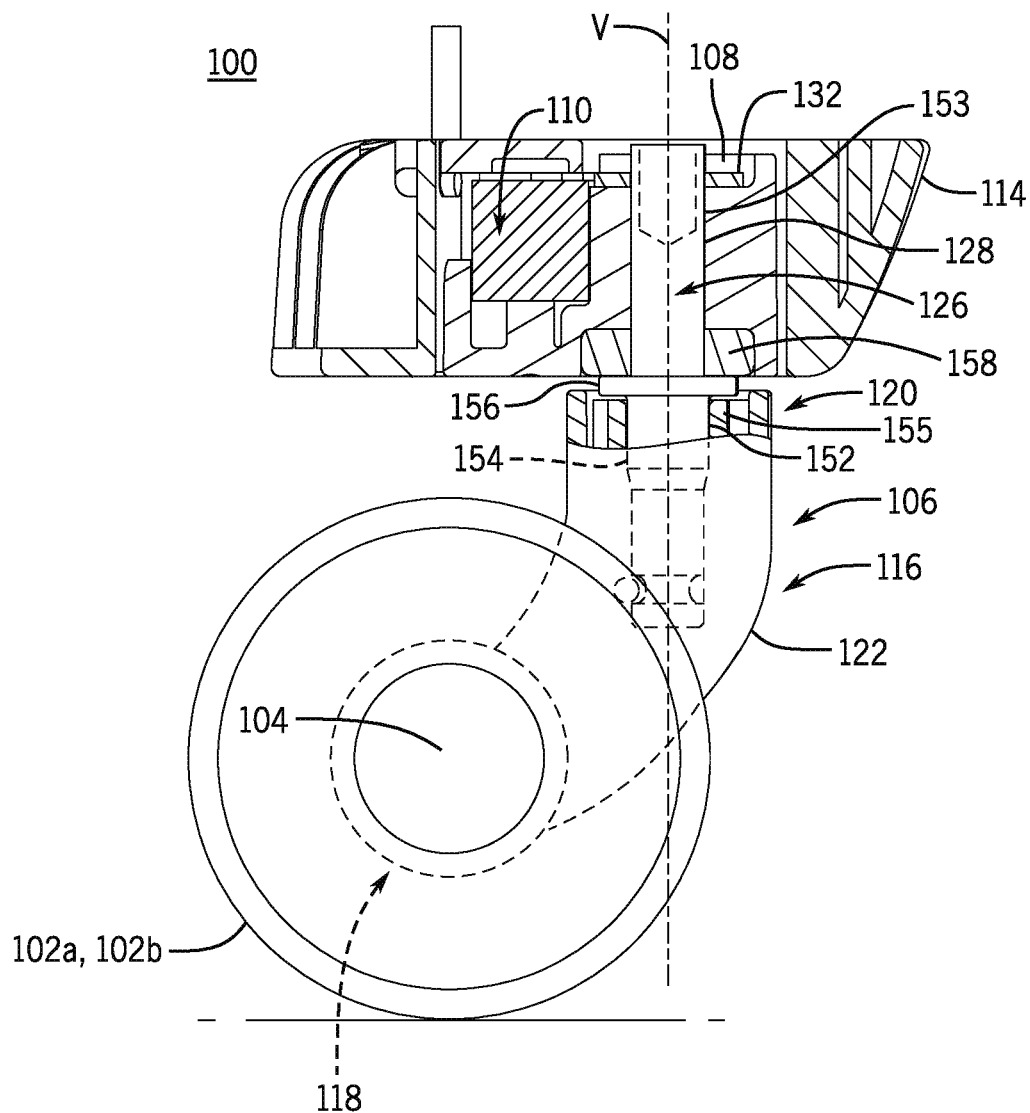
FIG. 5 is a section view of the weighing assembly of FIG. 1 taken along section line 5-5 of FIG. 1.

As shown in FIG. 5, the fork 106 has a main body 116 with two opposing ends 118, 120. Defined within the body 116 and disposed at the end 118 is the first axle 104, through which (axle, casters). A receptacle 154 is defined at the second end 120, extending into the body 116. A second axle 128 with a lower end 152 is disposed, and can pivot, within the receptacle 154. The lower end 152 may be received in a bearing 155 positioned in the receptacle 154. The second end 153 of axle 128 is received within and supported by the floating element 108.

The support housing 114 is coupled to a panel of the luggage article 101, and bears a portion of the weight of the luggage article 101 and its contents. In some examples, the support housing 114 is located at a corner 137 defined by an intersection of two or more panels of the luggage article. The support housing 114 includes a receptacle 150 adapted to receive the deflection member 110. The support housing 114 defines a number of apertures adapted to receive fasteners to secure the deflection member 110, and a load cell member 112.

The deflection member 110 has a body 144 with an upper surface 141, a lower surface 143, a proximal end 146 and a distal end 148. The deflection member 110 includes transverse apertures 142a, 142b that modify the elastic characteristics of the deflection member body 144. The body 144 is a beam in the embodiment 100 of the weighing assembly 100. In some embodiments, the body 144 is a substantially prismatic beam. In some embodiments, the body 144 may be rectilinear, or non-linear. The proximal end 146 and distal end 148 have rectangular cross sections. In other embodiments, the ends 146, 148 may have other cross sections or shapes (e.g., concave, convex, or the like). In some embodiments, the body 144 In other embodiments, the deflection member 110 may have different shapes than the prismatic beam shown, and may have different types, numbers and sizes of apertures, or may have no apertures at all. For example, in some embodiments, the deflection member may have a rectangular outer periphery in cross section. In other embodiments, the deflection member 110 may be cylindrical or have a circular or oval outer periphery in cross section. In still other embodiments, the deflection member may have any other polygon, regular or irregular, in cross section. In still other embodiments, the deflection member 110 may have an irregular cross section. In other embodiments, the deflection member may have a cross section that varies along its length, such as a ramp profile or a fillet. In some embodiments, the deflection member may have two or more longitudinal sections with any of the above cross sections adjacent to each other. For example, a deflection member 110 may have a rectangular cross section at the distal end 148, for instance to ease mounting and may have a longitudinal section with a circular cross section adjacent thereto. Apertures may be formed through the deflection member, such as to provide for mounting features or to modify a mechanical characteristic of the deflection member 110, such as its stiffness.

Figure 4:
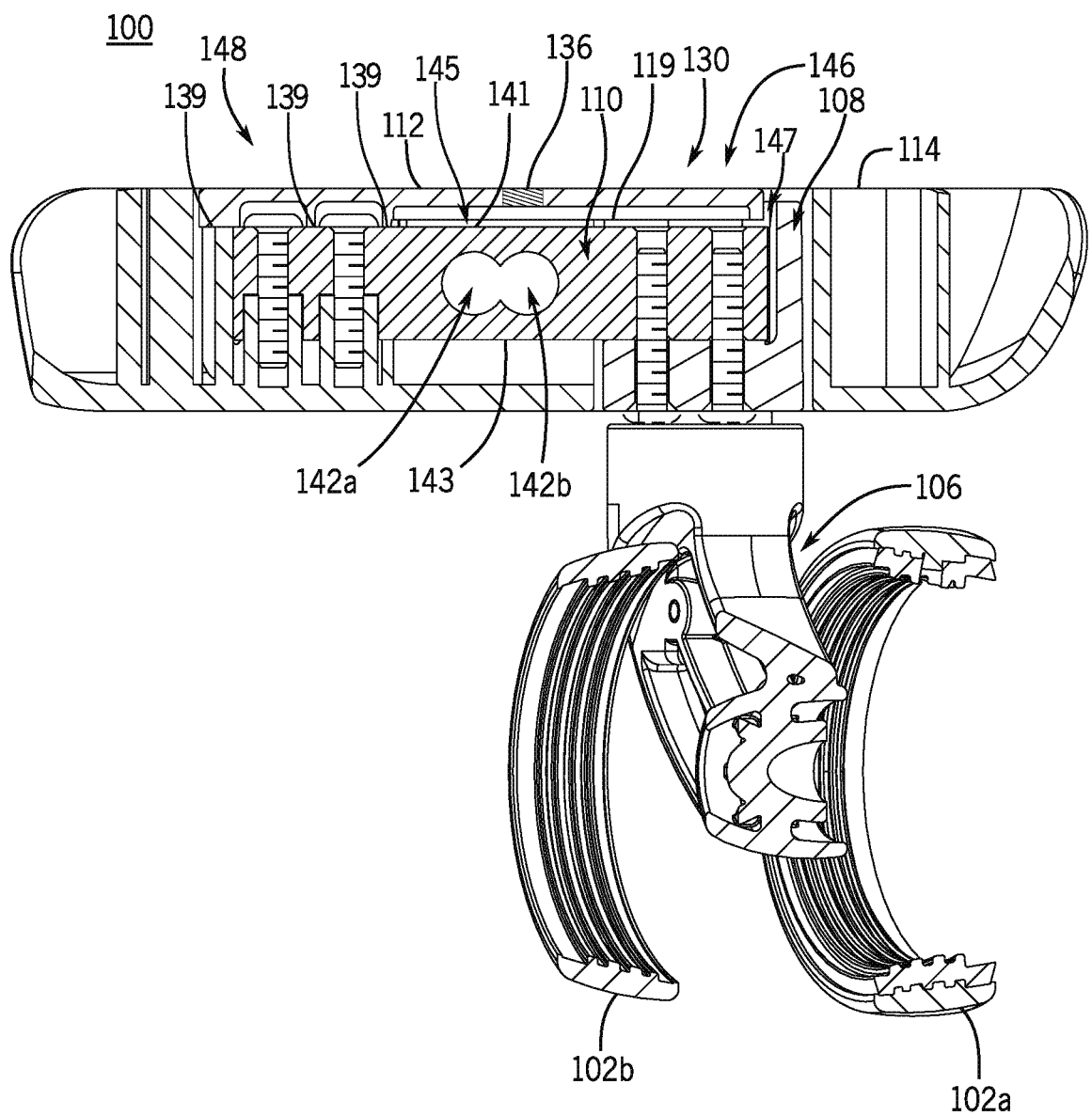
FIG. 4 is a section view of the weighing assembly of FIG. 1 taken along section line 4-4 of FIG. 1.

As shown in FIGS. 3-5, the floating element 108 does not make contact with the support housing 114. As shown in FIG. 2, the floating element 108 has a body 124. Disposed within the body 124 is an aperture 126 adapted to receive the second end 153 of the axle 128. The axle 128 is retained in the aperture 126 by a retainer 132. The axle 128 has a flange 156 in contact with a washer 158, that is in contact with the floating element 108. The axle 128 pivots within the aperture 126. The floating element 108 includes a receptacle 130 that is adapted to receive a portion of a deflection member 110. The floating element 108 and the deflection member 110 are fixedly secured together. The floating element 108 has two apertures 134a, and 134b that extend through the body into the receptacle. The apertures 134a, 134b are adapted to receive a bolt, rivet, screw or other fastener to secure a portion of the deflection member 110 to the floating element 108.

With continued reference to FIG. 2, defined within the proximal end 146 of the deflection member 110 are two apertures 138a, 138b that cooperate with the apertures 134a, 134b defined in the floating element 108 to receive fasteners to couple the floating element 108 to the deflection member 110. Defined within the distal end 148 of the body 144 are two apertures 140a, 140b that cooperate with mating apertures in the receptacle 150 of the support housing 114 to receive fasteners such as screws, rivets, or bolts to secure the deflection member 110 to the receptacle 150 of the support housing 114. In other embodiments, the deflection member may be coupled to the support housing and the floating element by methods and fasteners other than those mentioned. For example, the respective pieces could be glued together, such as with an adhesive.

The distal end 148 of the deflection member 110 is received in the receptacle 150 defined in the support housing 114. A proximal end 146 of the body 144 is fixedly secured to the floating element 108. A distal end 148 of the deflection member 110 is fixedly secured to the support housing 114. This arrangement forms a cantilevered structure that in this example transmits weight of the luggage case 101 from the case, to the support housing 114; from the support housing into the deflection member 110; from the deflection member 110 to the floating element 108; from the floating element 108, through a support 107, such as the spinner assembly 109, and ultimately to a support surface such as the ground. As shown in the example of FIGS. 2 and 4, the proximal end 146 of the body 144 is received in the receptacle 130 of the floating element 108.

Figure 6A:
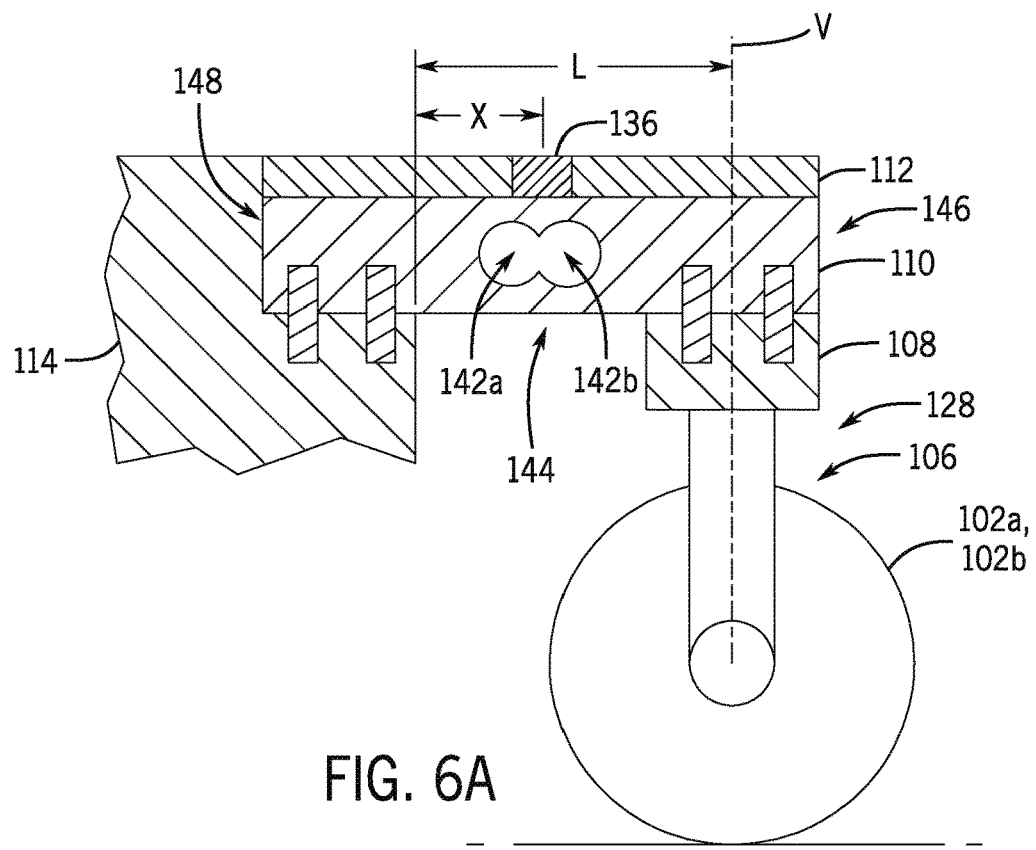
FIG. 6A is a simplified schematic illustration of the weighing assembly of FIG. 1 in a first, unloaded configuration.
Figure 6B:
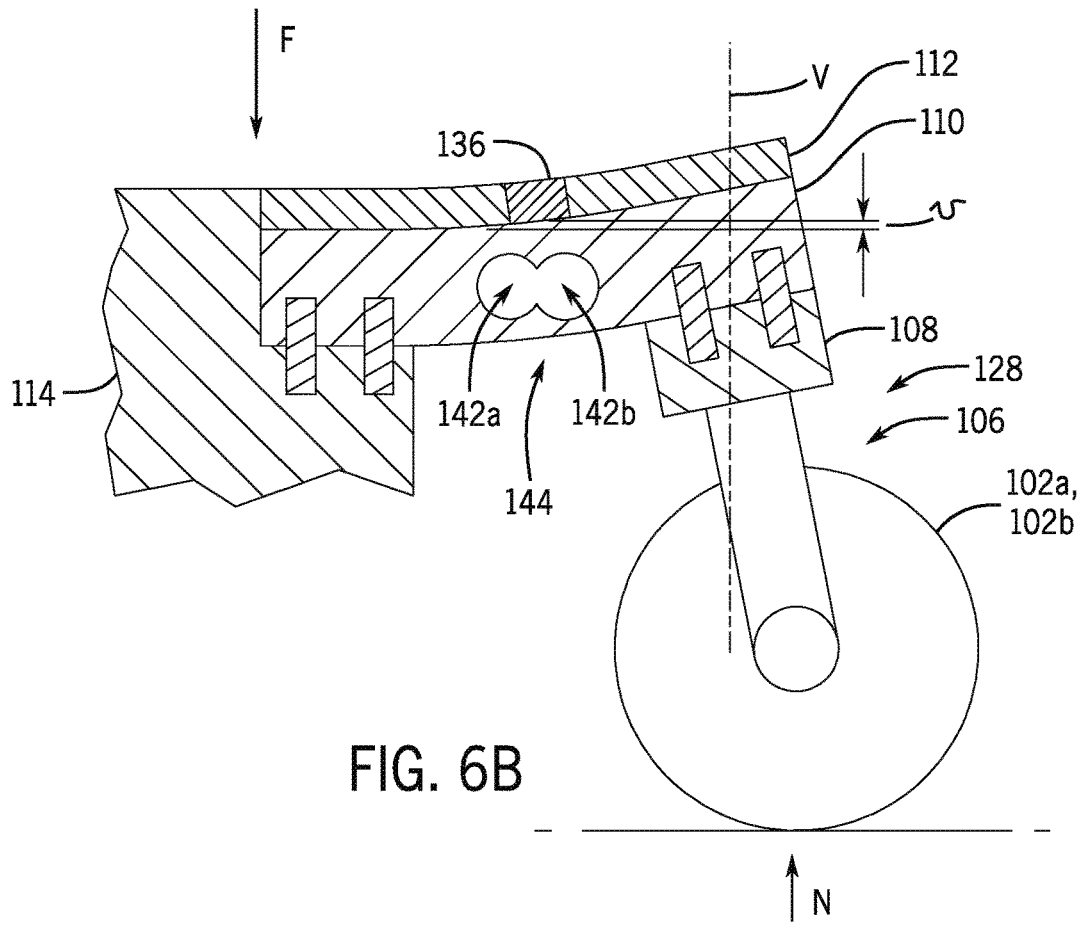
FIG. 6B is a simplified schematic illustration of the weighing assembly of FIG. 1 in a second, loaded configuration.

The cantilevered structure transmits weight from the case 101 to a support surface, and as it does so, the deflection member may deflect. In the preferred embodiment, deflection of the deflection member 110 is elastic. The deflection of the deflection member may be due to bending, shear, compression, tension, or combinations of these deflection modes. When the luggage case 101 is not supported on the weight assembly (e.g., when the luggage case is lifted off the support surface, or is laid down on a side such that the supports are not in contact with the support surface), the deflection member 110 may be at a neutral position. When the case 101 is supported on a support surface by a by a support, the deflection member 110 may deflect. For example, increased weight in or on the luggage case 101 may cause increased deflection of the deflection member 110 away from a neutral position. Likewise, decreased weight in or on the luggage case 101 may cause deflection of the deflection member 110 to tend toward a neutral position. The weight of the case 101 alone, such as when empty, may cause the deflection member 110 to deflect from a neutral position. As the luggage case 101 experiences dynamic vibrations for instance from moving along a surface, the deflection member 110 may deflect quickly back and forth and/or vibrate. As shown in FIGS. 6A and 6B, when deflecting, the axis V may deviate off of a substantially vertical line, such as when the luggage case 101 is loaded, and the deflection member 110 deforms.

In some examples, a weighing assembly 100 can detect a weight of up to 50 kg, or up to 70 kg. per support 107. Other weighing assemblies capable of determining higher or lower weights are contemplated. Such weight assemblies may use different geometry or materials of the deflection member 110, floating elements 108, and/or different load cell members 112. When multiple weighing assemblies 100 are used in a luggage case 101, the weights applied to the weighing assemblies 100 may be combined to determine a larger weight of a luggage case 101 than may be determined with a single weighing assembly 100. For example, the luggage case shown in FIG. 1 includes four weighting assemblies 100. If each weighing assembly 100 can, for example, determine a weight of 50 kg, the four weighing assemblies 100 combined can determine a weight of the luggage case 101 of 200 kg.

As shown in FIG. 2, the load cell member 112 has a body 160. The body 160 has a longitudinal structure defining a length, a lateral dimension (for instance a width), and a thickness, and opposing ends 162 and 164. The load cell member 112 may have multiple faces 113, 115, 117, 119 each aligned with a plane. The planes may be mutually parallel or mutually orthogonal. The body 160 is generally plate-like, with the length dimension greater than the lateral dimension, and the thickness dimension being much less than the length or width dimension. The body 160 may receive loads at either or both of the opposing ends 162, 164. In one example, the load cell member 112 receives a downward load at the end 162 and an upward load at the end 164. In another example, the load cell member 112 may receive a distributed load from the deflection member 110. The load cell member 112 is positioned adjacent to the deflection member 110, and is secured to the support housing 114. The load cell member 112 may be separable from the deflection member 110. The load cell member 112 may be separate from the deflection member 110. Additionally or separately, the load cell member 112 may be unaffixed, along its length, to the deflection member 110. Alternatively, the load cell member 112 may be affixed to the deflection member 110 at one portion along its length, or at more than one portion along its length, or may be affixed to the deflection member 110 along its entire length. The load cell member 112 may move up and down, such as by bending, with the deflection member 110 as the deflection member 110 moves up and down, such as by bending, in response to various loads being applied and released. During the up and down deflection of the deflection member 110, because the load cell member 112 is not affixed to the deflection member 110, the load cell member 112 may move relatively to the deflection member 110 along the length dimension to an extent generally determined by the amount of deflection of the deflection member 110. For instance, the more the deflection, the greater the relative movement.

The load cell member 112 may be in contact with the deflection member 110, or may be slightly spaced apart from the deflection member 110. The load cell member 112 may be continuously in contact with the deflection member 110, or may be in discrete or discontinuous contact therewith. One example of discrete or discontinuous contact is shown in FIG. 4, which shows more than one protrusions 139 extending downwardly from the lower surface 119 of the main body 160 of the load cell member 112 and contacting the upper surface 141 of the deflection member 110.

Portions of lower surface 119 of load cell member 112 that are unaffixed to the deflection member 110 may slip with respect to an upper surface 141 of deflection member 110 because the load cell member 112 and the deflection member 110 are bending in a curve having different effective radii of curvature. In some examples the load cell member 112 may slip along the length of the deflection member 110, which may be referred to as lateral slippage. In some embodiments, where a portion or portions of the load cell member 112 is affixed to the deflection member 110, the affixed portion or portions may not slip relative to the deflection member 110 while other portions that are not affixed to the deflection member 110 may slip relative thereto. In one example, such as is shown in FIGS. 3 and 4, at least a portion of the load cell member 112 (for example, as shown in FIG. 4, the protrusions 139) rests upon an upper surface 141 of the deflection member 110. The longitudinal length of the load cell member 112, or its mounting position relative to the deflection member 110 may define a gap 147 between an end of the load cell member and an end (e.g., the proximal end 146) of the deflection member 110. The gap 147 may be a clearance to allow for manufacturing variations, longitudinal growth of the load cell member 112 (such as due to thermal expansion), or to allow for lateral slippage of portions of the load cell member 112 when bending.

A strain sensor 136 is affixed to, embedded in, or otherwise bonded to the load cell member 112. In one example, as a load is applied to the luggage case, the deflection member 110 is caused to deflect or bend in accordance with the amount of the load. As the load cell member 112 bends according to the bend in the deflection member 110, a strain inducing force is created in the load cell member 112. That strain inducing force is detected by the strain sensor 136 and is converted to an electrical signal which can be interpreted as, and correlated to, a weight applied to the weighing assembly 100. In some embodiments, a gap 145 may be formed between the lower surface 119 of the load cell member and the upper surface 141 of the deflection member 110. The gap 145 may serve to produce a deadband in the response of the load cell member to the weight of the luggage case 101 or its contents, by allowing an amount of bending of the deflection member 110 before it contacts the load cell member 112. A deadband may be beneficial to reduce noise in a weight signal due to vibrations, or to tare the weight signal for the weight of the case 101 when empty.

In some embodiments, the load cell member 112 may include more than one strain sensor 136. In some examples, one strain sensor 136 may be associated with a top face 113 or the bottom face 119 of the load cell member, one strain sensor associated with a first side face 115, and one strain sensor associated with a second side face 117. The faces 115 and 117 may be oriented on planes that are parallel to, but offset from one another. The face 113 may be oriented on a plane that is orthogonal to the faces 115 and 117. The faces 113, 115, 117 may have strain sensors 136 associated with each side in separate chips. In another example, multiple strain sensors 136 may be mounted in a single chip, with the strain sensors 136 oriented in relation to different faces. In another example, three strain sensors may be associated with three mutually orthogonal planes (e.g., xy, yz, and xz planes) that define a three-dimensional coordinate system. The strain sensors may deflect at minute angles as weight is added to the weighing assembly 100, and the deflection member 110 deflects. In one example, the strain sensors 136 may detect weight in increments of 50 grams. Other embodiments may be adapted to detect larger or smaller weight increments. For example, a weighing assembly may be adapted to detect larger weight increments, and higher weight, by using a stiffer material or geometry for the deflection member 110. In another example, a weighing assembly 100 may be adapted to detect smaller weigh increments by using a less stiff material or geometry for the deflection member 110, or by using a higher resolution analog to digital converter.

For example, the deflection member 110 shown in the embodiment 100 of the weighing assembly is affixed to the support housing 114 such that it may be represented by a cantilevered beam as shown in the simplified schematics of FIGS. 6A and 6B. FIG. 6A illustrates the deflection member 110, when no load is applied and the deflection member 110 is in a neutral position. In this position, the load cell member 112 disposed adjacent to the deflection member 110 is configured to detect a neutral strain. The load cell member 112 includes a strain sensor 136 that determines a strain of the load cell member 112 imparted by the deflection member 110. In the schematic, a cantilevered distance L is shown as the distance between the point where the deflection member 110 and support housing 114 are fixed together and where the fork 106 imparts an upward force to the deflection member 110. The distance X is the distance from the point where the deflection member 110 and support housing 114 are fixed together to the strain sensor 136, such as a strain gauge.

The deflection member 110 may be a substantially prismatic beam made from a material of known elastic characteristics. In the embodiment of the weighing assembly 100, the deflection member 110 may comprise a steel bar. In other embodiments, the deflection member 110 may be made of other metals, such as aluminum, brass, iron, titanium, copper, tin, magnesium, zinc, lead, stainless steel, or alloys of the same. In other embodiments, the deflection member 110 may be made from a thermoplastic, a thermosetting plastic, or other polymer. In other embodiments, the deflection member 110 can be made of a composite material such as a material made of fibers of glass, carbon fiber, or aramid fiber composited with a polymer or epoxy matrix. In other embodiments still, the deflection member 110 may be made of combinations of these materials. The deflection member 110 may be made from a material, and/or with a geometry that can maintain accuracy of the weighing assembly following an impact (such as being dropped, mishandled, or collided with other luggage or objects). In some embodiments, the deflection member may absorb up to 20,000 or more load cycles without compromising weighing accuracy.

The deflection member 110 and the load cell member 112 have known elastic characteristics, such as an elastic or Young's modulus, shear modulus, and Poisson ratio, such that when the deflection member 110 and/or the load cell member 112 strains or deforms under a load the deformation of the deflection member 110 and/or the load cell member 112 can be correlated to the load applied.

As shown in FIG. 6B, when a load F is applied in a downward direction, for example by loading objects into the luggage case 101, a reacting force N is generated by the surface upon which the casters 102a, 102b sit, substantially parallel to the axis V. The reacting force N causes the deflection member 110 to bend elastically. Note that the displacement of the deflection member in FIG. 6B has been exaggerated for clarity. As the deflection member 110 bends, it causes the load cell member 112 to strain, which is detected by the strain sensor 136. The strain is correlated to the load N using mechanics of materials techniques known in the art. As the load F increases, the reacting force N increases, the bending of the deflection member 110 increases, and the strain of the load cell member 112 increases. Likewise, as the load F decreases, the reacting force N decreases, the bending of the deflection member 110 decreases, and the strain of the load cell member 112 decreases.

In the luggage case 101 shown in FIG. 2, the luggage case 101 includes four weighing assemblies 100. The weight of the luggage case 101, when resting with the wheels down on a surface, is divided between the four weighing assemblies. The distribution of weight may be even between the four weighing assemblies, but more likely is not evenly distributed. The distribution of weight can be affected by such factors as the uniformity of loading of articles into the luggage case 101, a slope to the surface on which the luggage case 101 stands, local roughness or un-evenness of the surface, manufacturing variations between the various weighing assemblies, and even the construction of the luggage case 101. Therefore, it may be advantageous to use a processing element (e.g., a CPU, field programmable gate array, microcontroller or the like) to determine weight readings from all four weighing assemblies and sum them to determine a total weight of the luggage case 101. In other embodiments of the luggage case 101, more or fewer weighing assemblies may be used. For example, if only a rough approximation of weight were desired, and cost savings were also desired, a luggage case might include only one weighing assembly 100, and the weight approximated as a multiple of the number of contact points of the luggage case 101 with the surface. For example, if the luggage case 101 had four contact points including one weighing assembly 100, the weight could be approximated as four times the reading of the single weighing assembly 100. In another example, if the luggage case 101 had three points of contact including one weighing assembly 100, the weight could be approximated as three times the reading of the weighing assembly 100. In another example, if a luggage case 101 had four contact points and two weighing assemblies, the weight could be approximated as two times the combined readings of the two weighing assemblies. Other suitable methods of combining weighing assembly 100 readings and/or determining a luggage case 101 weight from weighing assembly 100 readings are contemplated.

Figure 7:
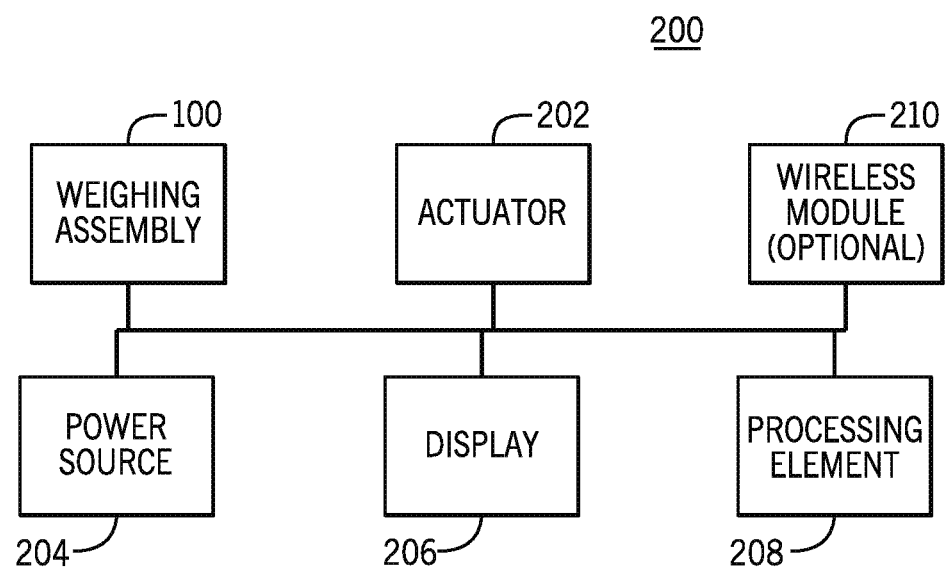
FIG. 7 is a simplified block diagram of a weighing system including a weighing assembly of FIG. 1.

FIG. 7 shows a simplified block diagram an example of a weighing system 200 including one or more weighing assemblies 100. An actuator 202 button, switch, toggle, other actuator may be used to activate a weighing assembly 100. For instance, a button 202 may be located on the luggage case 101 that causes a processing element 208 to determine a weight of the luggage case 101, and display or communicate that weight to a user on a display 206. The luggage case 101 may also receive an activation signal, to activate weighing of the case, from a wireless device such as a personal electronic device, via an optional wireless module 210 like radio, Bluetooth, infrared, or Wi-Fi. A total weight of a luggage case 101 can be communicated to a user via any suitable method. For example, a processing element 208 within the luggage case 101 can determine the weight readings of four weighing assemblies 100, sum or otherwise combine them to determine a total weight of the luggage case 101, and communicate the same information to a user by any suitable method. For example, the processing element 208 could communicate the weight to a user's mobile device (e.g., a cell phone) via wireless communication module 210 like radio, Bluetooth, infrared, or Wi-Fi. The processing element 208 can communicate the weight to a display 206, such as an LCD or LED display 206 associated with a luggage case 101. In one example, as shown in FIG. 1, an LCD display 206 may be located on an upper surface of the luggage case 101. The display 206 may be housed in a recessed area, for example to help prevent damage to the display 206 as the luggage case 101 is hauled, moved, and shipped. In another example, the processing element 208 can illuminate a light to indicate whether the luggage case 101 is overweight or underweight. For example, a red light may be illuminated to indicate the luggage case 101 is heavier than a threshold and a green light to indicate the luggage case 101 is below a threshold. A power source 204 can supply electrical power to the components of the system 200, such as the weighing assembly 100, the actuator 202, the display 206, the processing element, lights, and/or the wireless module 210. The power source can be a primary or secondary battery, a capacitor, generator, fuel cell, an AC to DC converter, a DC to DC converter, or the like.

What is claimed is:

1. A weighing assembly for a luggage case comprising:
   at least one support that carries a portion of a weight of the luggage case when positioned on a support surface;
   a deflection member coupled to the support wherein the portion of the weight of the luggage case causes a deflection of the deflection member; and
   a load cell member disposed adjacent to and separate from the deflection member, wherein:
      the load cell member is separate from the deflection member,
      the elastic deflection of the deflection member causes a deflection of the load cell member,
      the load cell member senses the amount of deflection, and
      the sensed deflection of the load cell member correlates to the portion of the weight of the luggage.

2. The weighing assembly of claim 1, further comprising a floating element disposed between the deflection member and the support to couple the support to the deflection member.

3. The weighing assembly of claim 1, wherein the deflection member is cantilevered from a support housing.

4. The weighing assembly of claim 3, wherein the support housing is adapted to couple to a luggage article, and wherein one portion of the deflection member is secured to the support housing, and another portion of the deflection member is secured to the floating member.

5. The weighing assembly of claim 4, wherein:
   the deflection member defines an elongated body member,
   the one portion is a first end portion, and
   the another portion is an opposing end portion.

6. The weighing assembly of claim 1, wherein the load cell member includes a strain sensor that correlates a strain of the load cell member to the deflection of the load cell.

7. The weighing assembly of claim 6, wherein at least one of the deflection of the load cell member or the deflection of the deflection member is correlated to at least a portion of the weight of the luggage case.

8. The weighing assembly of claim 6, wherein the deflection of the load cell member and the deflection of the deflection member are together correlated to at least a portion of the weight of the luggage case.

9. The weighing assembly of claim 6, wherein the load cell member includes three strain sensors that together correlate a respective strain of each of the three strain sensors to the deflection of the load cell member.

10. The weighing assembly of claim 1, wherein the deflection member comprises a prismatic beam.

11. The weighing assembly of claim 10, wherein the deflection member further comprises a transverse aperture that modifies an elastic characteristic of the deflection member.

12. The weighing assembly of claim 1, wherein the support is one of a spinner wheel, a foot, or a post.

13. A luggage case including the weighing assembly of claim 1, wherein the weighing assembly determines the weight of the luggage case.

14. The luggage case of claim 13, including a plurality of the weighing assemblies of claim 1.

15. The luggage case of claim 14, including four of the weighing assemblies of claim 1.

16. The luggage case of claim 14, further including a processing element that:
   communicates with each of the plurality of weighing assemblies;
   determines a weight associated with each of the plurality of weighing assemblies;
   combines the weight associated with each of the plurality of weighing assemblies to determine a total weight of the luggage case; and
   displays the total weight of the luggage case.

17. The luggage case of claim 16, including a display to display the total weight of the luggage case.

18. The luggage case of claim 15, wherein the weighing assembly is activated by an actuator.

19. The luggage case of claim 1, wherein a lower surface of load cell member slips with respect to an upper surface of deflection member.

20. A weighing assembly for a luggage case comprising:
   at least one support that carries a portion of a weight of the luggage case when positioned on a support surface;
   a substantially prismatic deflection member coupled to the support wherein the portion of the weight of the luggage case causes a deflection of the deflection member; and
   a load cell member affixed to the deflection member, wherein:
      the elastic deflection of the deflection member causes a deflection of the load cell member,
      the load cell member senses the amount of deflection, and
      the sensed deflection of the load cell member correlates to the portion of the weight of the luggage.

* * * * *